US012138906B2

(12) United States Patent
Schwiertz et al.

(10) Patent No.: US 12,138,906 B2
(45) Date of Patent: Nov. 12, 2024

(54) METHOD FOR ASSEMBLING OR REMOVING A HOLLOW CYLINDER ON OR FROM A FURTHER CYLINDER

(71) Applicant: XSYS Germany GmbH, Willstätt (DE)

(72) Inventors: Martin Schwiertz, Emsbüren (DE); Uwe Müller, Ahaus (DE); Klaus Bennink, Vreden (DE)

(73) Assignee: XSYS Germany GmbH, Willstätt (DE)

( * ) Notice: Subject to any disclaimer, the term of this patent is extended or adjusted under 35 U.S.C. 154(b) by 39 days.

(21) Appl. No.: 17/640,165

(22) PCT Filed: Sep. 11, 2020

(86) PCT No.: PCT/EP2020/075479
§ 371 (c)(1),
(2) Date: Mar. 3, 2022

(87) PCT Pub. No.: WO2021/048361
PCT Pub. Date: Mar. 18, 2021

(65) Prior Publication Data

US 2022/0314601 A1 Oct. 6, 2022

(30) Foreign Application Priority Data

Sep. 11, 2019 (EP) .................................... 19196732

(51) Int. Cl.
*B41F 27/00* (2006.01)
*B41F 27/10* (2006.01)

(52) U.S. Cl.
CPC .................................. *B41F 27/105* (2013.01)

(58) Field of Classification Search
None
See application file for complete search history.

(56) References Cited

U.S. PATENT DOCUMENTS 4,089,265 A 5/1978 White et al.
6,283,026 B1 9/2001 Tocheport et al.
(Continued)

FOREIGN PATENT DOCUMENTS

DE 202017103425 U1 10/2018
EP 1504899 A1 2/2005
(Continued)

OTHER PUBLICATIONS

International Search Report and Written Opinion for PCT/EP2020/075479, mailed Nov. 12, 2020 (10 pages).
(Continued)

*Primary Examiner* — Leslie J Evanisko
(74) *Attorney, Agent, or Firm* — KDW Firm PLLC

(57) ABSTRACT

A method for assembling a hollow cylinder on, or removing a hollow cylinder from, a further cylinder. The hollow cylinder includes a body with openings for creating an air cushion within a first portion of a shell and a second portion of the shell is gas-impervious or has openings for creating an air cushion of a reduced quantity and/or size compared to the first portion. The openings are connected to a gas feed and a gas inlet inside the body. The further cylinder has openings on a shell and gas is fed though the openings via an internal gas supply. An assembly method includes providing the hollow cylinder, applying a seal to the first portion to prevent escape of gas from the first portion, providing the further cylinder, applying gas to the further cylinder so that gas escapes from the openings, and pushing the hollow cylinder onto the further cylinder.

16 Claims, 4 Drawing Sheets

(56) References Cited

U.S. PATENT DOCUMENTS

| | | | |
|---|---|---|---|
| 7,107,907 B2 | 9/2006 | Vrotacoe | |
| 8,596,197 B2 | 12/2013 | Doucet et al. | |
| 10,538,078 B2 * | 1/2020 | Schwiertz | B41F 13/10 |

FOREIGN PATENT DOCUMENTS

| | | | |
|---|---|---|---|
| JP | 2010137473 | A | 6/2010 |
| WO | 2017194440 | A1 | 11/2017 |

OTHER PUBLICATIONS

Bussnoff H, "Sleeve-Technologie: Fundament Fuer Wichtige Flexo-Innovationen", Deutscher Drucker, Deutscher Drucker Verlagsgesellschaft, Ostfildern, DE, vol. 35, No. 41, Nov. 4, 1999 (Nov. 4, 1999), XP000958928.

* cited by examiner

METHOD FOR ASSEMBLING OR REMOVING A HOLLOW CYLINDER ON OR FROM A FURTHER CYLINDER

This application is a national stage filing under 35 U.S.C. 371 of pending International Application No. PCT/EP2020/075479, filed Sep. 11, 2020, which claims priority to European Patent Application No. 19196732.2, filed Sep. 11, 2019, the entirety of which applications are incorporated by reference herein.

The invention relates to a method for assembling a hollow cylinder on a further cylinder and for removing a hollow cylinder from a further cylinder, wherein the hollow cylinder comprises a cylindrical body in which openings for creating an air cushion are arranged within a first portion of a shell, and a second portion of the shell is designed to be gas-impervious, wherein the openings in the first portion of the shell are connected to at least one gas feed, which is connected to at least one gas inlet on the inside of the cylindrical body, and wherein the further cylinder has openings on a shell and gas can be fed through the openings via a an internal gas supply, wherein for the method for assembling a hollow cylinder and a further cylinder are provided and the hollow cylinder is pushed onto the further cylinder, and for the method for removing an arrangement is provided in which the hollow cylinder is placed on the further cylinder and the hollow cylinder is pulled off.

PRIOR ART

Flexographic printing is a high-pressure method in which a low-viscosity printing ink is transferred from the elevated areas of the printing mould onto a substrate. The distinguishing feature of flexographic printing is the use of flexible printing moulds, allowing a number of substrates (paper, card, films) to be printed. In addition to offset printing and gravure printing, flexographic printing is one of the main printing methods used in the packaging industry.

With flexographic printing machines, a distinction is made between multi-cylinder- and central cylinder printing machines. In the case of a central cylinder printing machine, the individual printing units are arranged around a central cylinder through which the substrate web runs. In the case of multi-cylinder printing machines, the individual printing units are arranged one behind the other. The printing units consist of the plate cylinder, an anilox roll for inking the printing mould and an ink fountain from which the printing ink is transferred to the anilox roll. In the simplest case, the plate cylinder consists of a steel roll onto which the flexographic printing mould is glued.

A major advantage of flexographic printing compared to other printing methods is its format variability. Different formats can be printed by using steel cylinders as a plate cylinder with a different diameter. The skilled person refers to what is known as the repeat length. The repeat length corresponds to the printing length for a full revolution of the plate cylinder. The replacement of the heavy steel cylinder is certainly time-consuming. Flexographic printing machines on which the repeat length can be adjusted more easily using adapter sleeves are therefore offered now. The adapter sleeve is pushed onto the steel cylinder. The wall thicknesses of standard adapter sleeves range from 7 mm to 300 mm. A printing sleeve on which the usually preassembled printing mould is located is then pushed onto the adapter sleeve. Adapter and printing sleeves are now generally also referred to as sleeves. Sleeves are made from plastic. They are significantly lighter than equivalent steel cylinders and can therefore be replaced in the printing machine much more easily.

A sleeve is usually structured as follows (from the inside outwards):

On a thin layer of GFRP (glass-fibre reinforced plastic) material, there is a thin compressible layer, which in turn is covered by a second thin layer of GFRP material. This composite layer enables the sleeves to be expanded by means of compressed air and will hereafter be referred to as the GFRP base sleeve. The GFRP base sleeve usually has a thickness of between 1 mm and 4 mm. A polyurethane foam layer with a thickness of between a few mm and a few cm is applied to the GFRP base sleeve. This layer is used to build up the layer thickness or to achieve the required repeat length. There is then usually a further thin GFRP layer or a thin top layer on the polyurethane foam layer to ensure the mechanical and chemical stability of the sleeve.

To ensure that the adapter sleeve can be pushed on easily, the plate cylinders have air vent holes from which compressed air escapes. As a result of the compressed air, an air cushion is built up, by means of which the inside diameter of the adapter sleeve is expanded and the adapter sleeve is guided over the plate cylinder. When the air supply is stopped, the adapter sleeve is clamped on the plate cylinder and fixed firmly in place there.

A cylinder with a partially gas-permeable surface comprising a cylindrical body is known from EP 3 243 660 A1. A first portion of the shell of the cylindrical body is designed to be porous and gas-permeable and a second portion of the shell of the cylindrical body is designed to be gas-impervious. The porous, gas-permeable first portion of the shell is connected to at least one gas feed and the first portion on the shell comprises at least 0.1% and no more than 50% of the total shell. Furthermore, a method for creating an arrangement in which a hollow cylinder is arranged on the cylinder is also described. In the method, gas is applied to the cylinder such that an air cushion is formed and the hollow cylinder is pushed on to the cylinder. Once the hollow cylinder is positioned on the cylinder, the gas supply is terminated again.

So that the printing sleeve can be pulled onto the adapter sleeve, the adapter sleeve also has an air duct system. Adapter sleeves in which compressed air is forwarded directly from the plate cylinder are known from the prior art. An arrangement of this kind is described as a bridge system. The adapter sleeve has air ducts extending from the inside of the adapter sleeve to the outside of the adapter sleeve so that the compressed air escaping from the plate cylinder can also create an air cushion over the adapter sleeve.

An adapter sleeve based on the bridge system is known from EP 1 263 592 B1. The adapter sleeve comprises a hollow, cylindrical tube which can be pulled onto a printing cylinder. The adapter sleeve has ducts extending radially from the inside outwards and culminating in openings on the surface.

The downside of this arrangement is that an air cushion between an adapter sleeve based on the bridge system and the plate cylinder is weakened by the escape of compressed air through the ducts and openings of the adapter sleeve. This makes it harder to push or remove an adapter sleeve of this kind onto or from a plate cylinder.

Adapter sleeves with a separate air connection on one of the front sides of the adapter sleeve (Airo system) are also known from the prior art. In the Airo system, the compressed air enters on the front side of the adapter sleeve and is then forwarded to the surface of the adapter by means of air ducts or compressed-air hoses. However, a second compressed-air connection in addition to the compressed-air connection for the plate cylinder is required for this.

There is therefore a need for a method and a device to in particular make it easier to pull the adapter sleeves based on the bridge system onto a plate cylinder.

DISCLOSURE OF THE INVENTION

A method for assembling a hollow cylinder on a further cylinder or for removing a hollow cylinder from a further cylinder is proposed wherein the hollow cylinder comprises a cylindrical body in which openings for creating an air cushion are located in a first portion of a shell and a second portion of the shell is designed to be gas-impervious or has openings, for creating an air cushion, of a reduced quantity and/or size compared to the first portion, wherein the openings in the first portion of the shell are connected to at least one gas feed, which is connected to at least one gas inlet on the inside of the cylindrical body, and wherein the further cylinder has openings on a shell and gas can be fed though the openings via an internal gas supply.

For assembly, the method comprises a first step a) in which the hollow cylinder is provided. In a subsequent step b) of the method, a seal is applied to the first portion of the shell of the hollow cylinder so as to prevent or at least reduce an escape of gas from the first portion of the shell. In a subsequent step c), the further cylinder is provided, and in the next step d), gas is applied to the further cylinder, so that gas escapes from the openings of the further cylinder. In the next step e), the hollow cylinder is pushed onto the further cylinder. As an option, the seal can be removed from the hollow cylinder in a further step f).

If a printing mould, such as a printing sleeve, is then to be assembled, it is preferable to remove the seal and then pull on the printing mould or printing sleeve, wherein gas is again applied to the further cylinder. Once the printing mould or printing sleeve has been assembled, the application of gas can be stopped. If, on the other hand, the intention is to not assemble a printing mould or printing sleeve directly on the further cylinder, the application of gas can be stopped, wherein the seal remains on the hollow cylinder as a form of protection.

For removal, the method comprises a first step g), in which an arrangement is provided in which the hollow cylinder is placed on the further cylinder. In a subsequent step h), a seal is applied to the first portion of the shell of the hollow cylinder so as to prevent or at least reduce an escape of gas from the first portion of the shell. In a subsequent step i), gas is applied to the further cylinder, so that gas escapes from the openings, and in the next step j), the hollow cylinder is then removed from the further cylinder. After this, the seal can either remain on the hollow cylinder or be removed from the hollow cylinder again in an optional further step k). Finally, the application of gas to the further cylinder can be stopped.

If the seal remains on the hollow cylinder, this is then preferably used as a protective cover to prevent the ingress of contaminants such as dust into the openings in the shell. This is particularly advantageous for prolonged storage of the hollow cylinder. In addition, the seal is used as a form of protection against mechanical influences and prevents damage.

The hollow cylinder comprises a cylindrical body, which is preferably largely the same as a body of an adapter sleeve known from the prior art. The cylindrical body comprises a tubular mould or a mould of a hollow circular cylinder and preferably comprises, as seen from the inside moving outwards, an expandable base sleeve, a foam layer, and a top layer. In particular, the base sleeve, the foam layer and the top layer are largely the same as those of the adapter sleeves from the prior art. A polyurethane foam is preferably used for the foam layer. A first portion of the shell is provided with openings for creating an air cushion and a second portion of the shell of the cylindrical body is designed to be gas-impervious or has openings, for creating an air cushion, of a reduced quantity and/or size compared to the first portion.

The at least one gas inlet of the hollow cylinders is designed, for example, as an opening which, when the hollow cylinder is pulled onto the further cylinder, is positioned over an opening of the further cylinder. The gas feed can comprise ducts and/or tubes which are arranged in the cylindrical body of the hollow cylinder so as to connect the at least one gas inlet to the openings in the shell. The at least one gas inlet is connected, for example, to an air duct of the gas feed of the hollow cylinder, by means of a radially designed groove, so that gas supplied via the further cylinder reaches the first portion of the shell.

The hollow cylinder is preferably designed as the adapter sleeve based on the bridge system. The further cylinder is preferably a plate cylinder.

When the hollow cylinder is pushed onto the further cylinder according to step e) or removed according to step j), the gas escaping from the openings in the further cylinder forms an air cushion which makes it easier for the hollow cylinder to slide on the further cylinder and preferably also expands the hollow cylinder. By providing the openings of the hollow cylinder with a seal, less air can escape when the hollow cylinder is pulled onto the further cylinder, thus preventing this air cushion from being weakened.

The shell of the further cylinder is preferably also divided into a first portion and a second portion, wherein the openings are located in the first portion of the shell and the second portion of the shell is designed to be gas-impervious or has openings, for creating an air cushion, of a reduced quantity and/or size compared to the first portion.

If the second portion of the hollow cylinder and/or the further cylinder is not designed to be fully gas-impervious, the second portion preferably has up to 5 openings with a diameter of up to 2 mm.

These are openings from which air also flows. These openings are analogously also preferably connected to the gas feed in the second portion. In the case of longer adapters or a long further cylinder, the air in the front section is not sufficient to maintain the air cushion through to the end of the adapter/cylinder.

The openings in the shell of the further cylinder and/or the openings in the shell of the hollow cylinder are preferably designed as air vent holes or as porous sections which are connected to a gas feed. If the second portion also has openings, these are preferably designed as air vent holes, but a design with individual porous sections would also be conceivable.

In order to design a portion of the shell as porous and gas-permeable, either finely porous materials or materials with a high proportion of openings per surface area can be used. Such materials can have sieve-like, screen-like, lamella-like, or slot-shaped openings.

A material with a high proportion of openings is understood to mean a material with at least one opening per 500 $mm^2$ surface area. The material with a high proportion of openings preferably has at least one opening per 200 $mm^2$ surface area. The diameter of the openings ranges from 0.1 mm to 1.5 mm and the number of openings is greater than 8, preferably greater than 10 and particularly preferably greater than 12. The openings can be distributed evenly or unevenly around the circumference and can be arranged in one or multiple rows.

The outer surface of the material with the high proportion of openings forming the porous portion of the shell has, for example, a proportion of openings per surface area ranging from 0.3% to 90%. The surface of the porous portion of the shell preferably has a proportion of openings per surface area of between 10% and 90%. A proportion of openings per surface area ranging from 15% to 80% is particularly preferred and a proportion of openings per surface area ranging from 20% to 60% is even more particularly preferred. For example, the proportion of openings per surface area ranges from 0.3% to 50%. The openings are designed as continuous or branched openings or ducts and are connected to the gas feed. The diameter of the openings or the width of the ducts or slots ranges from 100 μm to 5 mm, and preferably ranges from 500 μm to 2 mm. The gas is particularly air which is fed to the cylinder in the form of compressed air.

Finely porous materials are understood to mean materials in which the pores account for a volume share of the material of between 1% and 50%, particularly preferably between 5% and 40% and even more preferably between 10% and 30%. The percentage figure is based on the share of the pores in the volume of the entire porous material. The pore size ranges from 1 μm to 500 μm, preferably from 2 μm to 300 μm, preferably from 5 μm to 100 μm and even more preferably from 10 μm to 50 μm. The pores are preferably distributed homogenously across the volume of the finely porous material. Examples of such materials include foamed materials with open cells or sintered porous materials.

Permeability is determined in accordance with ISO 4022:1987, for example, wherein the pressure loss after flowing through the porous material is measured with a specified filter surface area at a specified volumetric flow rate at a constant pressure and temperature, and the coefficient of flow a is specified for laminar flow and β for turbulent flow. The porous materials according to the invention preferably have a α value greater than $0.01*10^{-12}$ $m^2$ and a β value greater than $0.01*10^{-7}$ m. The porous materials particularly preferably have an a value greater than $0.05*10^{-2}$ $m^2$ and a 3 value greater than $0.1*10^{-7}$ m.

The first portion of the shell containing openings is preferably divided into a single section or into multiple sections. A section containing openings is preferably designed as a ring running around the entire circumference or a section containing openings comprises multiple partial sections which are designed and arranged in the form of a broken ring running around the entire circumference. The width of a ring preferably ranges from 1 cm to 20 cm and particularly preferably ranges from 5 cm to 15 cm.

Alternatively, or in addition, at least one section with openings can be provided in the form of a strip running axially.

Any gas can be used as the gas to be applied to the further cylinder according to step d) or step i) of the method, but compressed air is preferably used. In some circumstances, it may be sensible to use inert gases (for example nitrogen, argon, helium, or $CO_2$) to avoid a fire or explosions, or to prevent or reduce undesirable reactions (e.g. oxidation) of products or components. The gases are mostly used under pressure in order to be able to create the appropriate gas cushion, and the pressures vary from 1 bar to 30 bar, preferably from 4 bar to 8 bar, depending on the application.

When applying a seal in accordance with step b) or h) of the method, a gas-impervious material is preferably brought into close contact with the first portion of the shell. In the process, the gas-impervious material is preferably applied to the first portion of the shell such that said portion of the shell is fully covered.

The gas-impervious material is preferably flexible. The gas-impervious material is particularly preferably provided in the form of a film.

The film is preferably a plastic film or metal foil. Suitable plastic films are made, for example, from a plastic chosen from the following group: polyolefins, poly(meth)acrylates, polyamides, polyurethanes, polyimides, polyvinylchloride (PVC), polystyrene (PS), polyester and polycarbonate (PC). Suitable polyolefins particularly include high- and low-density polyethylene (PE) and polypropylene (PP). Suitable polyesters particularly include polyethylene terephthalate (PET). Suitable metal foils include, for example, aluminium foil, spring steel and nickel strip.

Furthermore, the gas-impervious material can be an elastomer film which can be made, for example, from natural rubber (NR), nitrile butadiene rubber (NBR), styrene-butadiene-styrene/styrene-isoprene-styrene (SBS, SIS) rubbers, polychloroprene (CR), ethylene propylene diene monomer (EPDM) rubber or combinations thereof.

The films can also be a composite or mixture of two or more of the aforementioned plastics and be reinforced with fibre materials made from glass, carbon, or metal.

The gas-impervious material preferably adheres to the first portion of the shell by means of adhesion. An adhesive film which adheres to the surface of the further cylinder without the use of adhesive is particularly preferably used for this. An adhesive film comprising polyethylene, polypropylene, polyester, or polyurethane can be used, for example. In addition to adhesive bonds, hook-and-loop fasteners can also be used to secure films and/or strips.

In addition, it is also possible to use a film, particularly a plastic film, which has been coated with an adhesive as a gas-impervious material. In particular, standard adhesive strips containing the aforementioned plastics, are suitable for this.

The flexible material is preferably designed in a strip form and is wound around the hollow cylinder in step b) or h) such that at least the first portion of the shell of the hollow cylinder is covered. In particular, a plastic film or elastomer film made from the aforementioned plastics can be used in the form of a strip of material. The film can optionally be fixed in place with adhesive and/or a hook-and-loop fastener.

The flexible material designed in strip form preferably has a width ranging from 10 mm to 250 mm, particularly preferably ranging from 20 mm to 150 mm and even more particularly preferably ranging from 25 mm to 75 mm.

Alternatively, the flexible gas-impervious material is preferably designed in tube form and is pulled over at least the first portion of the shell of the hollow cylinder in step b) or h), thereby covering at least the first portion of the shell of the hollow cylinder. In particular, a plastic film shaped in a tube or elastomer film made from the aforementioned plastics can be used. Elastomer tubes or shrinkable plastic tubes are particularly preferable here.

The inside diameter chosen for the tube-shaped flexible material is, particularly for an elastomer tube, the same size as, or slightly smaller than the outside diameter of the further cylinder, so that the tube is extended when it is placed on the further cylinder and adheres well to the further cylinder. For example, an inside diameter 1 mm to 5 mm smaller than the outside diameter is chosen.

Alternatively, an inside diameter of the tube-shaped flexible material the same size as, or slightly larger than the outside diameter of the further cylinder is preferably chosen for a shrinkable plastic tube in particular. For example, an inside diameter 1 mm to 5 mm larger than the outside diameter is chosen. Examples of suitable plastic materials for a shrinkable plastic tube include low-density polyethylene (PE) or polypropylene (PP).

If a shrinkable plastic tube is used, this is preferably pushed onto the shell of the hollow cylinder in a first partial step and then shrunk-fit in a second partial step, for example by introducing heat.

An assembly aid is preferably pushed over at least the first portion of the shell of the hollow cylinder in step b) or h) of the method, wherein the assembly aid is designed in the form of a sleeve and comprises a gas-impervious sleeve body, wherein the sleeve body has an inside diameter that is up to 5%, preferably up to 3%, and particularly preferably up to 0.2% smaller than, equal to, or larger than the outside diameter of the hollow cylinder, and wherein the assembly aid preferably has a mechanical stop which limits how far the assembly aid can be pushed onto the further cylinder. If the inside diameter is larger than the outside diameter of the hollow cylinder, an inside diameter of no more than 5%, particularly preferably no more than 3% and particularly preferably no more than 1% larger should preferably be chosen.

A mechanical stop can be designed as a stop arranged inside the sleeve body or as a stop arranged on the outside of the sleeve body. In both cases, the mechanical stop can be designed as an edge protruding beyond the inside diameter of the sleeve body towards the centre of the sleeve body and thus mechanically limiting how far the assembly aid can be pushed onto the further cylinder.

A mechanical stop can, for example, be designed as a ring, or one or more ring segments, which is connected to the inside of the sleeve body and is therefore designed as an internal stop, or it can be fastened to the front side of the sleeve body and therefore be designed as an external stop.

In addition, a mechanical stop can be designed as a disc which fully or partially seals the front side of the sleeve body. This again mechanically limits how far the assembly aid can be pushed onto the further cylinder. Where the disc only forms a partial seal, the disc has at least one opening, for example.

The sleeve body of the assembly aid preferably has at least one sealing ring on its inside, wherein the sealing ring seals the assembly aid against the shell of the hollow cylinder. Unlike a mechanical stop, the seal does not prevent the assembly aid from being pushed onto the further cylinder.

In addition to the first portion of the shell of the hollow cylinder, the sleeve body preferably also covers at least part of the second portion of the shell of the hollow cylinder. The covered part of the second portion of the shell is preferably 1 to 10,000 times larger, particularly preferably 5 to 5000 times larger, and even more particularly preferably 10 to 1000 times larger than the first portion of the shell.

A further object of the invention is to provide an assembly aid which is arranged for use with one of the methods described here.

An assembly aid for use in one of the methods described here for assembling or removing a hollow cylinder on or from a further cylinder is therefore being proposed. The assembly aid is designed in the form of a sleeve and comprises a gas-impervious sleeve body, wherein the sleeve body has an inside diameter that is up to 5%, preferably up to 3%, and particularly preferably up to 0.2% smaller than, equal to, or larger than the outside diameter of the hollow cylinder, and also comprises at least one mechanical stop limiting how far the assembly aid can be pushed onto the further cylinder.

A mechanical stop can be designed as a stop arranged inside the shell body or as a stop arranged on the outside of the sleeve body. In both cases, the mechanical stop can be designed as an edge which protrudes beyond the inside diameter of the sleeve body towards the centre of the sleeve body and thus mechanically limits how far the assembly aid can be pushed onto the further cylinder. The mechanical stop can, for example, be designed as a pin which runs through the entirety of the sleeve body, or part of it, wherein the pin can be present in the form of a screw, pin, plate, or rivet.

A mechanical stop can, for example, be designed as a ring or one or multiple ring segments which is connected to the inside of the sleeve body and is therefore designed as an internal stop, or it can be fastened to a front side of the sleeve body and therefore be designed as an external stop.

Furthermore, a mechanical stop can be designed as a disc which fully or partially seals the front side of the sleeve body. This again mechanically limits how far the assembly aid can be pushed onto the further cylinder.

The mechanical stop can be made from an inflexible, solid material, or alternatively from an elastic, flexible material. The mechanical stop is preferably made from an elastic material. If an elastic, flexible material is used, the stop can firstly cushion impacts during mounting. Secondly, such a stop made from an elastic material can easily be fastened to the sleeve body, for example by means of gluing. To this end, the material from which the stop is made can be provided in strip form and then be cut to size and glued to the sleeve body from the inside. Examples of suitable materials for an elastic material for a mechanical stop particularly include elastomers such as natural rubber (NR), nitrile butadiene rubber (NBR), polychloroprene (CR), ethylene propylene diene monomer (EPDM) rubber or combinations thereof. Nitrile butadiene rubber (NBR) is particularly preferable.

The sleeve body preferably has at least one sealing ring on the inside, wherein the sealing ring seals the assembly aid against the shell of the hollow cylinder. Unlike a mechanical stop, the seal does not prevent the assembly aid from being pushed onto the further cylinder.

Examples of suitable materials for the sealing ring include elastomers such as natural rubber (NR), nitrile butadiene rubber (NBR), polychloroprene (CR), styrene-butadiene-styrene/styrene-isoprene-styrene (SBS, SIS) rubbers, ethylene propylene diene monomer (EPDM) rubber or combinations thereof.

The sleeve body of assembly aid is preferably designed to be open at one end and closed at the other end. There is a mechanical stop at the closed end which fully or partially covers the corresponding front side.

The sleeve body preferably has at least two sealing rings on the inside which are arranged to form a seal against the shell of the hollow cylinder. The provision of two sealing rings can, for example, also be combined with a mechanical stop and in particular also with a closed end of the sleeve body.

The sleeve body of the assembly aid comprises at least one gas-impervious base layer made from a flexible or rigid material.

The material of the base layer is preferably chosen from a plastic, a polymer composite, a fibre-reinforced plastic, a metal, or combinations of at least two of these materials.

The sleeve body preferably also comprises a compressible layer, which can be a base layer, an intermediate layer, and/or an outer layer. The compressible layer is preferably an outer layer.

The material of the compressible layer is preferably chosen from the following group: elastic solid materials, elastic foams, materials filled with hollow balls, or combinations of these materials.

The elastic material is chosen, for example, from a natural rubber, a vulcanised rubber, an ethylene propylene diene monomer rubber, a styrene-butadiene copolymer, a styrene-isoprene copolymer, a polyurethane, a polyether block amide, a silicone rubber, or combinations thereof. An example of a suitable vulcanised rubber is polyester urethane rubber. The elastic foam is chosen, for example, from the following group: polyurethane foam, polyester urethane foam, epoxide foam, silicone foam, or combinations of several of these foams.

The compressible layer preferably has a thickness ranging from 0.1 mm to 30 mm. The thickness particularly preferably ranges from 0.5 mm to 10 mm, even more preferably from 0.7 mm to 5 mm and most preferably from 1 mm to 3.5 mm.

The proposed assembly aid is preferably used for pushing on and/or removing a hollow cylinder preferably designed as an adapter sleeve onto or from a further cylinder. The further cylinder is preferably designed as a plate cylinder.

A further object of the invention is to provide an arrangement which comprises an assembly aid according to the invention arranged on a hollow cylinder.

The proposed arrangement comprises a hollow cylinder and one of the assembly aids described here, wherein the hollow cylinder comprises a cylindrical body in which openings for creating an air cushion are arranged within a first portion of a shell and a second portion of the shell is designed to be gas-impervious or has openings, for creating an air cushion, of a reduced quantity and/or size compared to the first portion, wherein the openings in the first portion of the shell are connected to at least one gas feed, which is connected to at least one gas inlet on the inside of the cylindrical body, and wherein the assembly aid is arranged on the hollow cylinder such that it fully covers at least the first portion of the shell and seals the openings in the first portion of the shell.

The hollow cylinder is preferably an adapter cylinder and the further cylinder is preferably a plate cylinder.

EXAMPLES

To determine the pull-off force which is required for removing a hollow cylinder designed as an adapter, an arrangement comprising an adapter and cylinder was produced, wherein the adapter was pushed onto the cylinder. A hollow cylinder with an inside diameter of 86.06 mm, an outside diameter of 114.708 mm, a gas supply and openings was provided by way of an adapter. The hollow cylinder has openings on its outer shell which are designed as a porous area with a surface area of 3600 mm$^2$ and a porosity of 18%, in order to create an air cushion. This hollow cylinder was connected to a Spider8 force transducer (Hottinger Baldwin Messtechnik GmbH) such that it is force-fit. This hollow cylinder was mounted on a carbon cylinder (outside diameter 86.06 mm) with a gas supply and openings for creating an air cushion. The carbon cylinder has openings designed as a porous area, wherein the porous area has a surface area of 2700 mm$^2$ and a porosity of 18%. Once the arrangement had been assembled, the pull-off force required to remove the adapter from the carbon cylinder was measured. An air cushion was created to make it easier to remove said adapter. To create the air cushion, compressed air was applied to the carbon cylinder at a pressure of 6.5 bar and a flow rate of 720 l/min. To amplify the measuring signal of the force transducer, the latter was connected to an HBM Spider8 measuring amplifier (Hottinger Baldwin Messtechnik GmbH) and the amplified signals are read out with a computer and the catmanEasy 3.2.3.40 software (Hottinger Baldwin Messtechnik GmbH). The maximum force during removal of the adapter was determined and an average value calculated from 5 measurements.

The tests were all performed without an assembly aid and using a range of different assembly aids. A Rotec-Tape (Rotec) adhesive tape, a shrink film, and a hollow cylinder were used as assembly aids. The hollow cylinder with a 1 mm-thick inner layer of glass-fibre reinforced polyester, a 3 mm-thick compressible layer of polyurethane foam, a 2 mm-thick glass-fibre reinforced polyester layer and a 7 mm-thick outer layer made from a filled polyurethane foam has an inside diameter of 114.708 mm, an outside diameter of 124 mm and a length of 5 cm. An internal stop made from an elastic material extending all the way around one side is provided. A nitrile butadiene rubber was used as an elastic material. The mechanical stop is 2 mm in height and 5 mm in width. The requisite maximum pull-off force for each assembly aid was determined as described above. The test results are shown in Table 1.

TABLE 1

| Assembly aid | Pull-off force [kN] | Air consumption | Protection against contaminants | Mechanical protection |
|---|---|---|---|---|
| None (reference) | 4.5 | Very high | None | None |
| Shrink film | 5.5, | Low | Good | Low |
| Adhesive tape | 8.1 | Low | Good | Low |
| Cylinder | 1.8 | Very low | Excellent | High |

Table 1 shows that the use of an assembly aid can reduce the pull-off force and/or the quantity of air required. Furthermore, the assembly aids offer the openings protection against contaminants and mechanical damage.

BRIEF DESCRIPTION OF THE FIGURES

The figures show the following:

FIGS. 1*a* to 1*e* shows a schematic representation for pushing a hollow cylinders 100 onto a further cylinder 200.

FIG. 1*a* shows a hollow cylinder 100 with a shell 102 comprising a first portion 110 and a second portion 120. The first portion 110 of the shell 102 contains openings 103 for creating an air cushion, wherein the openings 103 in the first portion 110 of the shell 102 are connected to at least one gas feed 104, which is connected to at least one gas inlet 105. The second portion 120, on the other hand, is designed to be gas-impervious. The hollow cylinder 100 is, for example, an adapter sleeve which is to be pushed onto a plate cylinder.

Figure 1A:
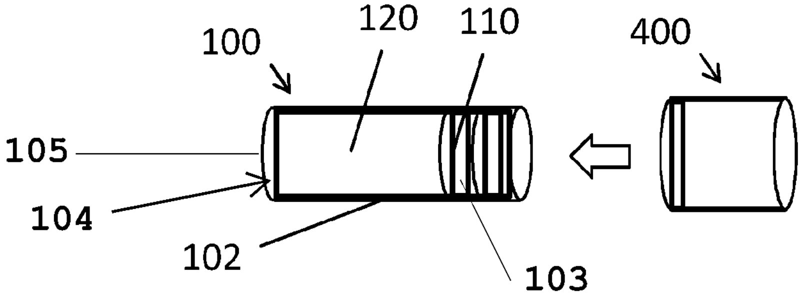
FIGS. 1*a* to 1*e* a hollow cylinder being pushed onto a further cylinder using an assembly aid, FIG. 2 openings of a hollow cylinder being sealed using a web-like flexible material.

When such a hollow cylinder 100 is pushed onto a plate cylinder, an air cushion is formed by means of a gas which escapes from openings in the plate cylinder, and this air cushion makes it easier for the hollow cylinder 100 to slide on the plate cylinder and preferably also expands the hollow cylinder 100 in the process. However, as the gas escapes in part via the openings 103 in the first portion 110 of the shell 102 of the hollow cylinder 100, this air cushion is weakened and pushing the hollow cylinder onto the plate cylinder becomes harder.

To avoid, or at least reduce, the escape of gas from the first portion 110 of the shell 102 during assembly, an assembly aid 400 is provided.

The assembly aid 400 is designed as a sleeve body 402 which in the embodiment shown in FIG. 1*a* is open at one end, see FIGS. 3, 4, 5 and 6.

The arrow shown in FIG. 1*a* indicates the direction in which the assembly aid 400 is pushed onto the hollow cylinder 100.

Figure 1B:
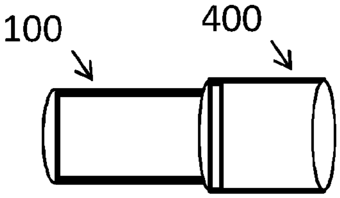

The hollow cylinder 100 with the assembly aid 400 arranged thereon is shown in FIG. 1*b*. The assembly aid 400 is pushed onto the hollow cylinder 100 as far as is mechanically possible, wherein the closed end of the sleeve body 402 of the assembly aid 400 acts as a mechanical stop and prevents the assembly aid from being pushed any further onto the hollow cylinder.

Figure 1C:
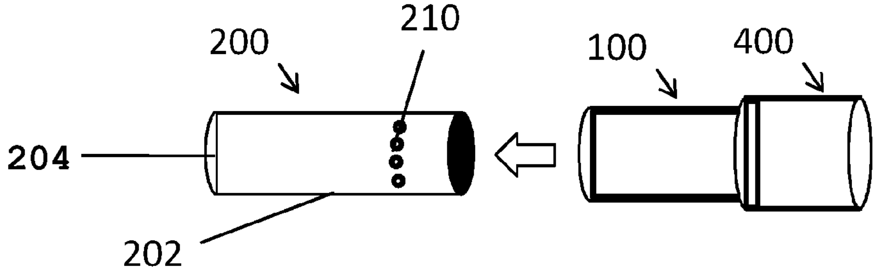

In this position, the assembly aid 400 creates a seal for the openings 103 in the first portion 110 of the shell 102 of the hollow cylinder 100, so that less air escapes when the hollow cylinder 100 is pulled onto a further cylinder 200, see FIG. 1*c*. This prevents the air cushion between the hollow cylinder 100 and the further cylinder 100 from being weakened, or this effect is at least reduced.

FIG. 1*c* shows a further cylinder 200, which for example is designed as a plate cylinder. The further cylinder 200 has openings 210 on its shell 202 which in the embodiment shown in FIG. 1*c* are arranged in the form of a circumferential rings close to one of the ends of the further cylinder 200.

As indicated with the arrow in FIG. 1*c*, the arrangement already described in relation to FIG. 1*b* comprising the hollow cylinder 100 and the assembly aid 400 is pushed onto the further cylinder 200, wherein a gas such as compressed air is applied to the further cylinder 200 and fed though the openings 210 via an internal gas supply 204. As a result of the application of compressed air, air escapes from the openings 210, causing an air cushion to form and making it easier to push on the arrangement comprising the hollow cylinder 100 and assembly aid 400. The assembly aid 400 prevents the compressed air from immediately escaping again via the first portion 110 of the shell 102 of the hollow cylinder 100.

Figure 1D:
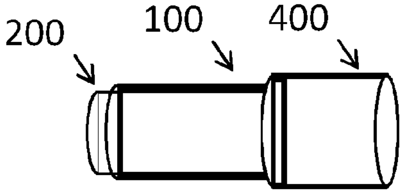

FIG. 1*d* shows the arrangement comprising the hollow cylinder 100 and the assembly aid 400 in a state where it is pushed fully onto the further cylinder 200.

Figure 1E:
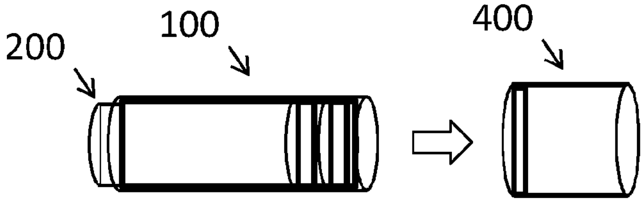

FIG. 1*e* shows the assembly aid 400 being removed from the hollow cylinder 200. As shown with the arrow in FIG. 1*e*, the assembly 400 is removed again in the opposite direction. The application of compressed air to the further cylinder 200 can be stopped before or after removal of the assembly aid 400. Alternatively, compressed air first continues to be applied to the further cylinder 200 in order to complete the assembly of a printing mould or printing sleeve, wherein an air cushion is created from air escaping from the first portion 110 of the shell 102 of the hollow cylinder 100 and this air cushion assists with the assembly of a printing mould or printing sleeve.

The hollow cylinder 100 can be removed from the further cylinder 200 by carrying the steps described above in reverse order.

Figure 2:
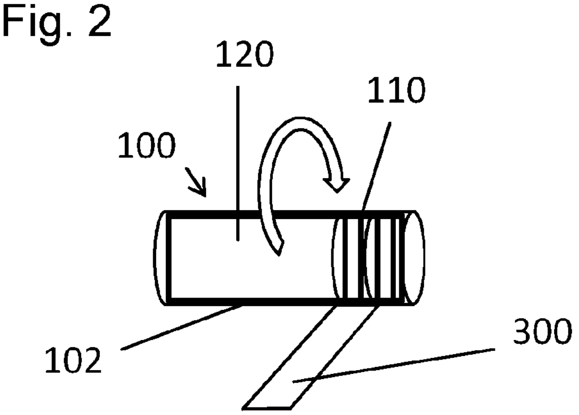

FIG. 2 shows the openings of a hollow cylinder 100 in the first portion 110 of the shell 102 using a web-like flexible materials 300.

The web-like flexible material 300 can be used to carry out the steps sketched out in FIGS. 1*a* to 1*e* instead of an assembly aid 400. To this end, the web-like flexible material 300 is wound around the first portion 110 of the shell 102 of the hollow cylinder 100, as indicated with the arrow in FIG. 2. The web-like flexible material 300 is gas-impervious and designed, for example, as a plastic film. This plastic film can in particular be designed as an adhesive film which adheres to the shell 102 without using an adhesive. Alternatively, the plastic film can be designed as an adhesive tape largely comprising a plastic film coated with an adhesive.

Figure 3:
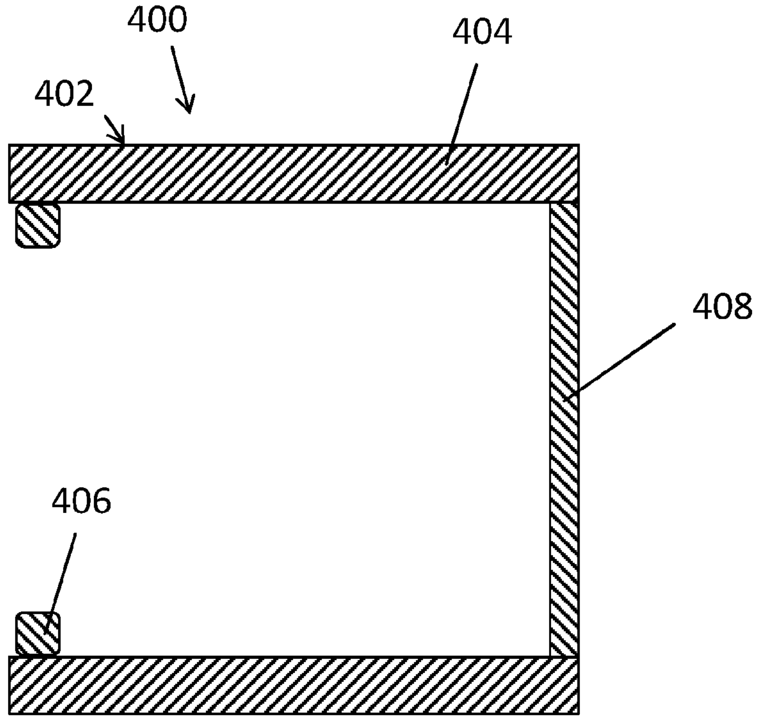
FIG. 3 a cross-section of an assembly aid according to a first embodiment.

FIG. 3 shows a cross-section of the assembly aid 400. In the first embodiment shown in FIG. 3, the assembly aid 400 comprises a sleeve body 402 which is shaped like a hollow cylinder. The sleeve body 402 comprises at least a base layer 404 and in further embodiment variants can have additional layers such as a compressible layer.

In the embodiment shown in FIG. 3, the sleeve body 402 is closed at one end with a disc-like end face 408. The end face 408 constitutes a mechanical stop which limits how far the assembly aid 400 can be pushed onto a hollow cylinder 100, see FIG. 1*a*.

A circumferential sealing ring 406 is located inside the sleeve body 402 at the other end. If the assembly aid 400 is pushed onto a hollow cylinder 100, this sealing ring 406 forms a seal against the shell 102 of the hollow cylinder 100, so that a sealed space is created between the shell 102 of the hollow cylinder 100 and the sleeve body 402 of the assembly aid 400. Gas escaping from the first portion 110 of the shell 102 of the hollow cylinder 100 is thus trapped and the gas is prevented from escaping, or the volume of gas escaping is at least reduced.

Figure 4:
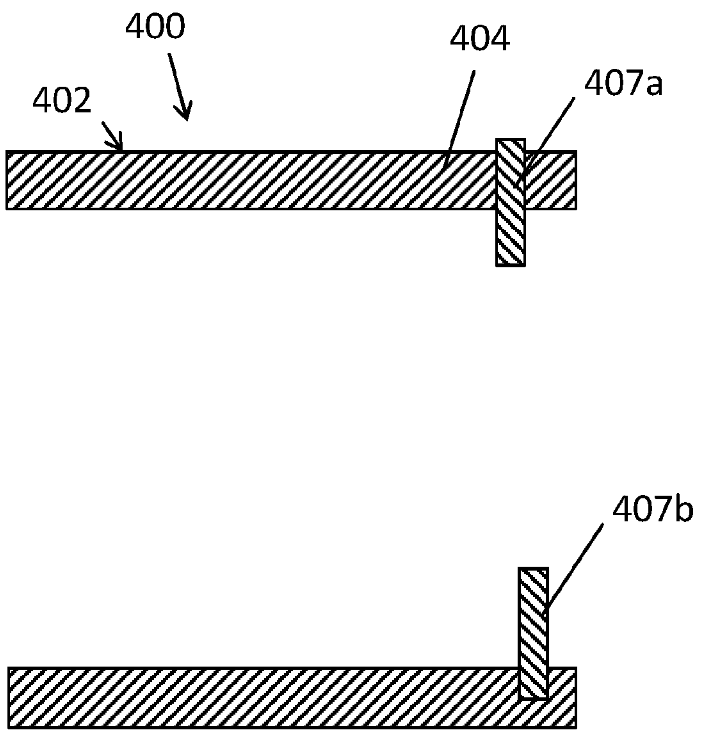
FIG. 4 a cross-section of an assembly aid according to a second embodiment.

FIG. 4 shows a cross-section of a second embodiment of the assembly aid 400. Unlike the first embodiment described in relation to FIG. 3, this embodiment has open ends. Stops 407*a* and 407*b* which can be used independently of each other are also shown. An inserted end-to-end stop 407*a* is designed in the form of a pin penetrating the sleeve body. An inserted stop 407*b* is designed in the form of a pin incorporated into the sleeve body.

Depending on the application, different embodiment variants for the mechanical stops can be combined, or all stops can be designed uniformly.

Figure 5:
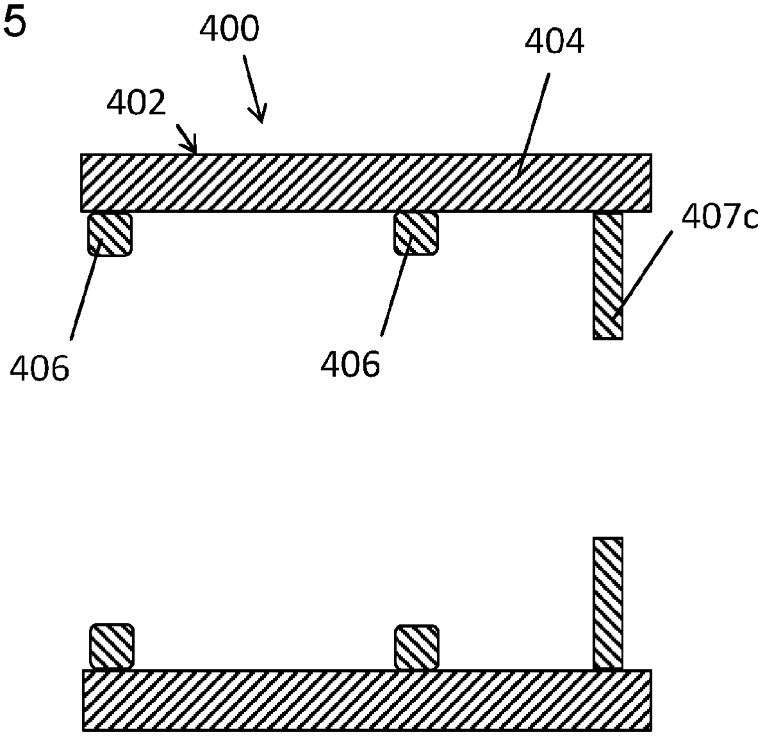
FIG. 5 a cross-section of an assembly aid according to a third embodiment.

FIG. 5 shows a cross-section of a third embodiment of the assembly aid 400. Unlike the first embodiment described in relation to FIG. 3, two sealing rings 406 are arranged inside the sleeve body 402 of the assembly aid 400 at a distance from each other. The distance between the two sealing rings 406 and their arrangement is to be chosen so that when the assembly aid 400 is pushed fully onto the hollow cylinder 100, see FIG. 1*a*, the first portion 110 of the shell 102 sits between the two sealing rings 406.

A stop 407*c* located inside the sleeve body 402 is arranged to ensure the correct alignment of the assembly aid 400. The stop 407*c* is preferably annular or comprises a broken ring of multiple ring segments. The stop 407*c* is made, for example, from a flexible material such as a natural rubber and is fastened to the sleeve body 402 from the inside.

Figure 6:
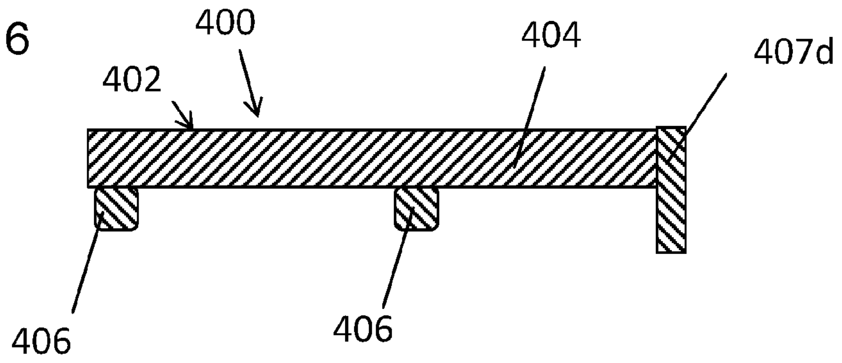
FIG. 6 a cross-section of an assembly aid according to a fourth embodiment.
Figure 6:
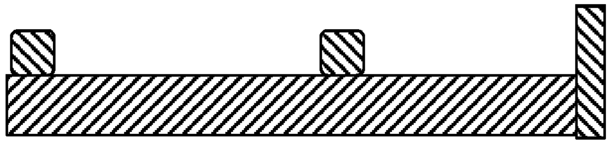

FIG. 6 shows a cross-section of a fourth embodiment of the assembly aid 400. The fourth embodiment of the assembly aid 400 differs from the third embodiment, which was described in relation to FIG. 5, in the arrangement of the stop 407*d*. The stop 407*d* is fastened to the front side of the sleeve body 402 from the outside, for example by means of gluing.

REFERENCE LIST

100 Hollow cylinder
102 Shell of hollow cylinder
110 First portion
120 Impervious second portion
200 Further cylinder
202 Shell of further cylinder
210 Openings
300 Flexible material
400 Assembly aid
402 Sleeve body
404 Base layer
406 Sealing ring
407*a* Internal stop as an end-to-end pin
407*b* Internal stop as an inserted pin.
407*c* Internal stop as a ring or ring segment
407*d* External stop as a ring or ring segment
408 End face

The invention claimed is:

1. A method for assembling a hollow cylinder on a further cylinder, wherein the hollow cylinder comprises a cylindrical body in which openings for creating an air cushion are arranged within a first portion of a shell and a second portion of the shell is designed to be gas-impervious or has openings, for creating an air cushion, of a reduced quantity and/or size compared to the first portion, wherein the openings in the first portion of the shell is connected to at least one gas feed, which is connected to at least one gas inlet on the inside of the cylindrical body, and wherein the further cylinder has openings on a shell and gas can be fed through the openings in the further cylinder via an internal gas supply, wherein the method for assembling comprises the following steps:

a) providing the hollow cylinder,
b) applying a seal to the first portion of the shell of the hollow cylinder so as to prevent or reduce an escape of gas from the first portion of the shell,
c) providing the further cylinder,
d) applying gas to the further cylinder so that gas escapes from the openings in the further cylinder,
e) pushing the hollow cylinder onto the further cylinder, and
f) removing the seal.

2. The method according to claim 1, wherein the seal is part of an assembly aid which is pushed over at least the first portion of the shell of the hollow cylinder in step b), and wherein the assembly aid is designed in the form of a sleeve and has a gas-impervious sleeve body.

3. The method of claim 2, wherein the sleeve has two open ends.

4. The method of claim 3, wherein the assembly aid comprises at least one mechanical stop which limits how far the assembly aid can be pushed onto the further cylinder, wherein said at least one mechanical stop comprises any one of the following: a stop designed in the form of a pin, a stop designed as an annular ring or multiple stops designed as multiple ring segments.

5. The method of claim 2, wherein the sleeve is closed at one end with a disc-shaped end-face which constitutes at least one mechanical stop which limits how far the assembly aid can be pushed onto the further cylinder.

6. The method according to claim 2, wherein the sleeve body has an inside diameter which is up to 5% smaller than, equal to, or up to 5% larger than the outside diameter of the hollow cylinder.

7. The method according to claim 6, wherein the sleeve body comprises at least a sealing ring on its inside, wherein the sealing ring seals the assembly aid against the shell of the hollow cylinder.

8. The method according to claim 6, wherein a shell of the sleeve body covers at least part of the second portion of the shell of the hollow cylinder in addition to the first portion of the shell of the hollow cylinder.

9. The method according to claim 1, wherein the openings of the further cylinder and/or the openings in the first portion of the shell of the hollow cylinder are designed as air vent holes or as porous areas.

10. The method according to claim 1, wherein when a seal is applied in accordance with step b) of the method a gas-impervious material is brought into close contact with the first portion of the shell.

11. The method according to claim 10, wherein the gas-impervious material fully covers the first portion of the shell.

12. The method according to claim 10, wherein the gas-impervious material is flexible.

13. The method according to claim 12, wherein the gas-impervious material adheres to the first portion of the shell by means of adhesion.

14. The method according to claim 12, wherein the flexible material is designed in web form and is wound around the hollow cylinder step b) so that at least the first portion of the shell of the hollow cylinder is covered and is fixed in place by means of adhesive and/or a hook-and-loop fastener.

15. The method according to claim 12, wherein the flexible gas-impervious material is designed in a tubular form and is pulled over at least the first portion of the shell of the hollow cylinder in step b).

16. A method for removing a hollow cylinder from a further cylinder, wherein the hollow cylinder comprises a cylindrical body in which openings for creating an air cushion are arranged within a first portion of a shell and a second portion of the shell is designed to be gas-impervious or has openings, for creating an air cushion, of a reduced quantity and/or size compared to the first portion, wherein the openings in the first portion of the shell is connected to at least one gas feed, which is connected to at least one gas inlet on the inside of the cylindrical body, and wherein the further cylinder has openings on a shell and gas can be fed through the openings in the further cylinder via an internal gas supply, wherein the method for removing comprises the following steps:

a) the provision of an arrangement in which the hollow cylinder is placed on the further cylinder,
b) the application of a seal to the first portion of the shell of the hollow cylinder so as to prevent or reduce an escape of gas from the first portion of the shell, c) the application of gas to the further cylinder so that gas escapes from the openings in the further cylinder, and
d) the removal of the hollow cylinder from the further cylinder.

* * * * *